US009781607B2

(12) United States Patent
Rath et al.

(10) Patent No.: US 9,781,607 B2
(45) Date of Patent: Oct. 3, 2017

(54) NETWORK RESOURCE OPTIMIZATION IN COMMUNICATION NETWORKS

(71) Applicant: Tata Consultancy Services Limited, Mumbai (IN)

(72) Inventors: Hemant Kumar Rath, Bangalore (IN); K N R Surya Vara Prasad, Bangalore (IN); Vishvesh Revoori, Bangalore (IN); Anantha Simha, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 318 days.

(21) Appl. No.: 14/204,923

(22) Filed: Mar. 11, 2014

(65) Prior Publication Data

US 2015/0009857 A1 Jan. 8, 2015

(30) Foreign Application Priority Data

Jul. 3, 2013 (IN) .......................... 2254/MUM/2013

(51) Int. Cl.
*H04L 12/28* (2006.01)
*H04W 16/18* (2009.01)
(Continued)

(52) U.S. Cl.
CPC ......... *H04W 16/18* (2013.01); *H04L 41/0823* (2013.01); *H04L 41/12* (2013.01);
(Continued)

(58) Field of Classification Search
CPC .... H04W 16/18; H04L 41/12; H04L 41/0823; H04L 41/145; H04L 41/5035; H04L 24/02
(Continued)

(56) References Cited

U.S. PATENT DOCUMENTS 7,366,108 B2  4/2008 Szentesi et al.
7,639,988 B2  12/2009 Abusch-Magder et al.
(Continued)

OTHER PUBLICATIONS

Abolhassani et al., "A Two-Phase Genetic K-Means Algorithm for Placement of Radioports in Cellular Networks," IEEE Transactions on Systems, Man, and Cybernetics-Part B: Cybernetics 34(1):533-538, Feb. 2004.
Szabo, "Optimization Problems in Mobile Communications," DIS-S.ETH No. 16207, Dissertation, Swiss Federal Institute of Technology, ETH Zurich, 2005, 175 pages.

*Primary Examiner* — Thai Hoang
(74) *Attorney, Agent, or Firm* — Seed IP Law Group LLP

(57) ABSTRACT

System(s) and method(s) for network resource optimization in a service area of a communication network are described. The method includes dividing a service area into a plurality of sub-areas, where each of the plurality of sub-areas is serviced by at least one network resource from a pre-determined number of network resources. The method further includes determining a locally optimal deployment solution comprising at least one local allocation attribute for the at least one network resource in each of the plurality of sub-areas, to meet a plurality of objectives for network resource optimization. The method further includes obtaining a globally optimal deployment solution comprising at least one global allocation attribute for allocation of the pre-determined number of network resources in the service area, based on the locally optimal deployment solution to meet the plurality of objectives.

17 Claims, 2 Drawing Sheets

(51) Int. Cl.
*H04L 12/24* (2006.01)
*H04W 24/02* (2009.01)
(52) U.S. Cl.
CPC ........ H04L 41/145 (2013.01); H04L 41/5035 (2013.01); *H04W 24/02* (2013.01)
(58) Field of Classification Search
USPC ................ 370/254–256, 328–330, 335–338; 455/422.1–425, 450–454, 507–513, 561, 455/562.1, 115.1–115.4
See application file for complete search history.

(56) References Cited

U.S. PATENT DOCUMENTS

| | | | |
|---|---|---|---|
| 2004/0203459 A1* | 10/2004 | Borras-Chia | H04W 24/02 455/67.13 |
| 2011/0039554 A1* | 2/2011 | Bims | H04L 1/0033 455/434 |
| 2012/0009909 A1* | 1/2012 | Lau | H04W 52/143 455/418 |
| 2013/0281089 A1* | 10/2013 | Chandrasekhar | H04W 24/04 455/434 |
| 2014/0051475 A1* | 2/2014 | Cheng | H04W 52/146 455/522 |

\* cited by examiner

NETWORK RESOURCE OPTIMIZATION IN COMMUNICATION NETWORKS

FIELD OF INVENTION

The present subject matter relates to network resource optimization in communication networks and, particularly, but not exclusively, to network resource optimization for a service area of a communication network.

BACKGROUND

In recent years, communication using communication devices has become an integral part of human life. Communication devices, such as computers, mobile phones, televisions, radios, and the like, are connected to communication networks using one or more communication technologies. The communication networks comprise various network resources, such as signal transceivers, deployed to provide connection and facilitate communication with the communication devices.

Generally, the deployment of network resources in a communication network is made on the basis of various factors including Quality of Service (QoS), minimum coverage area, etc., in order to meet the requirements of the users on the communication network. The network resources in a communication network are deployed in a manner to ensure proper network resource utilization and efficient operation of the communication network for meeting the user requirements.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some system and/or methods in accordance with implementations of the present subject matter are now described, by way of example, and with reference to the accompanying figures, in which.

Figure 1:
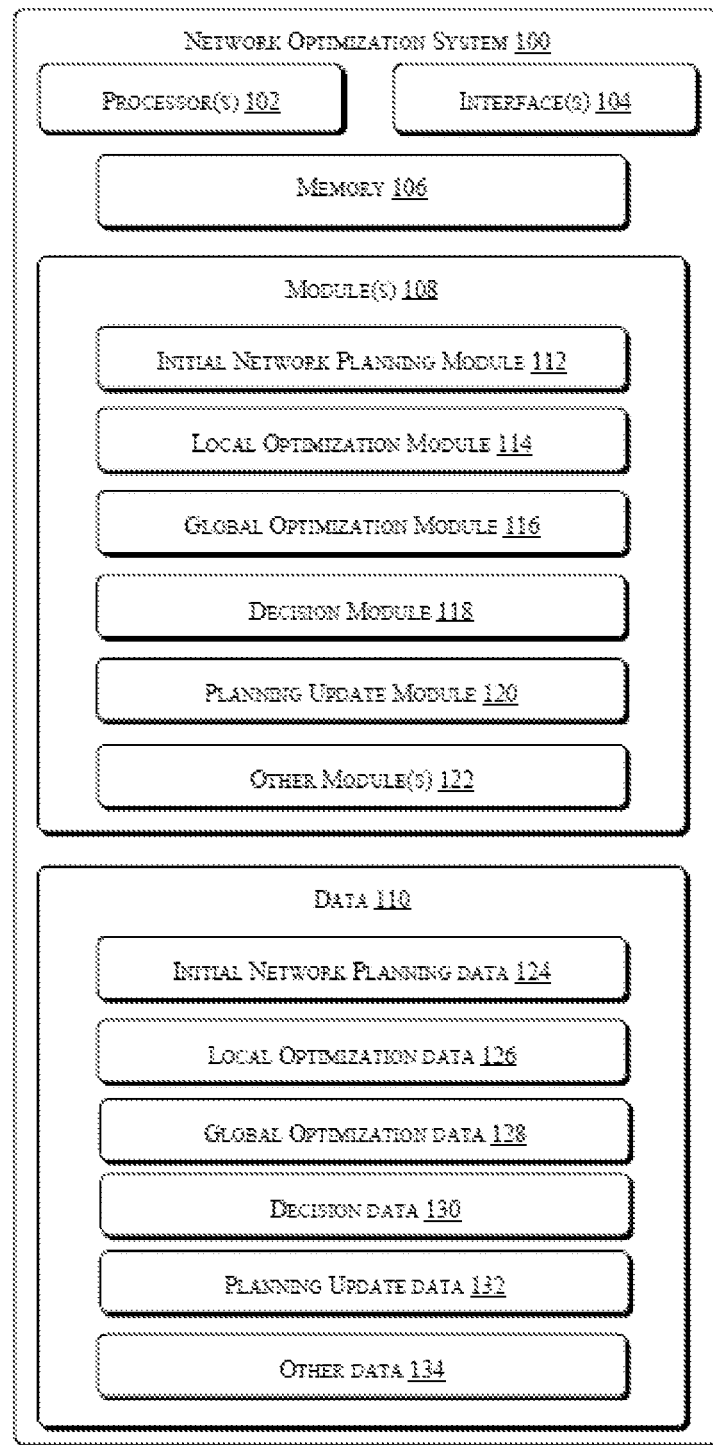
FIG. 1 schematically illustrates a network optimization system, in accordance with an implementation of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DESCRIPTION OF EMBODIMENTS

Systems and methods for network resource optimization in communication networks are described. The systems and methods for network resource optimization in communication networks can be implemented in a variety of computing devices. The computing devices may include, but not limited to, computers, servers, and the like. Although the description herein is with reference to certain communication networks and computing devices, the systems and methods of the present subject matter may be implemented in other networks and devices, albeit with a few variations, as will be understood by a person skilled in the art.

With the growth of communication services offered to subscribers on a communication network, an exponential growth in the number of subscribers is being witnessed. Communication service providers, in order to provide services to a large number of subscribers, without compromising on the subscribers' experience, focus on planning, management and optimization of their communication networks. Typically, during implementation of a communication network, a deployment solution for the communication network is developed with respect to the network resources of the communication network, and the network resources are allocated based on the deployment solution. The deployment solution for the communication network is developed to optimize positions and configuration of a plurality of network resources based on parameters, such as position, height, number of sectors, frequency planning, transmission power.

The optimization of positions and configuration of the network resources is a constrained parameter optimization problem with a set of controlled variables, such as the requisite number of network resources, the locations of the network resources, transmission power, number of sectors, height of the antenna used, and uncontrolled variables, such as communication traffic density, communication channel condition, interference scenario, spectrum, topography. Due to the combined effects of the constrained parameters, finding an optimal deployment solution for allocation of the network resources is a Non-deterministic Polynomial-time hard (NP-hard) combinatorial problem which is complex and requires a substantial time for solving.

Further, sub-optimal deployment solutions to such complex problems are typically obtained with a desired level of optimality in polynomial time using certain meta-heuristic approaches. The choice of a meta-heuristic approach depends on several controlled variables, uncontrolled variables, and performance measures, which may include an expected optimality, computation time, and the like. Once an approach is chosen, a finite number of parameters are chosen and are aggregated as an input set to a network planning system. The network planning system then iteratively improves a deployment solution with regard to a finite number of performance measures.

Owing to the computational complexity generally involved in meta-heuristic approaches, the choice of input parameters and their initial values influence the convergence time and accuracy of the resulting sub-optimal deployment solution. In other words, the design and implementation of the computational method play a crucial role in the level of accuracy and optimality of the yielded time bound deployment solutions.

Generally, various techniques, such as random search, clustering approach, genetic approach, and simulated annealing, are followed to obtain one or more deployment solutions for the allocation of the network resources in the communication networks. A service area as a whole may be considered and one or more of the techniques may be used to obtain the deployment solution for the allocation of the network resources in the service area of the communication network.

Typically, the time taken for computing the optimal or sub-optimal deployment solutions for the allocation of the network resources increases with the increase in area of the service area. Hence, the time taken for obtaining deployment solution for the allocation of the network resources while considering the service area as a whole is more. In order to reduce the time taken to obtaining deployment solution for the allocation of the network resources, a methodology where the service area is divided into an approximate number of sub-areas and each sub-area or a collection of few sub-areas, is selected for obtaining the deployment solution. Once the optimal or sub-optimal deployment solution for the allocation of the network resources is obtained for each of the sub-areas or each of the collection of few of the sub-areas, a deployment solution for the service area can be obtained by combining all the deployment solutions corresponding to each of the sub-area or each of the collection of few of the sub-areas. However, the deployment solution for the service area obtained by the combining may not consider factors, such as overlap of the area coverage provided by the network resources, and hence, such methodology may not provide an optimal deployment solution for the allocation of the network resources in the whole of the service area.

As mentioned, obtaining the optimal deployment solution for the network resource allocation is a multi-objective and multi-constraint optimization problem. Typically, a set of objectives, such as optimal Quality of Service (QoS) requirements, optimal coverage area and optimal number of network resources, based on which the deployment solution for the network resource allocation in the communication network is to be developed are contradictory to each other. Such contradictory parameters may not facilitate a substantial optimization of network resources in the communication network.

The present subject matter describes systems and methods for network resource optimization in communication networks. The network resources in a communication network may include base stations (BS), cell phone towers, WiMAX base stations, Long-Term Evolution (LTE) Base Stations, such as evolved Node B (eNodeB), and the like. The systems and the methods of the present subject matter provide for optimization of network resources for their allocation with a substantial accuracy and in a substantially reduced time.

In an implementation of the present subject matter, a joint optimization method is implemented for network resource optimization in a service area of a communication network. For joint optimization, the service area is divided into a plurality of sub-areas, such that, each of the plurality of sub-areas is serviced by one or more network resources. The division of service area into the plurality of sub-areas may be based on a pre-determined number of network resources servicing the service area and a number of network resources servicing each sub-area.

Corresponding to each of the sub-areas, a locally optimal deployment solution is determined to meet a plurality of objectives, such as pre-defined deployment cost, a pre-defined coverage area, and a pre-defined service-level agreement parameter, for the network resource optimization. In accordance with an implementation of the present subject matter, the locally optimal deployment solution is a solution indicative of positions and configurations of the network resources, individually, in all the sub-areas of the service area, such that the objectives are met. The locally optimal deployment solution may include one or more local allocation attributes, such as a position, a height, a transmission power, an electrical tilt, a mechanical tilt, a number of sectors, operating frequencies, and an azimuth, of each of the signal transceivers deployed in each of the sub-areas, where the signal transceivers form a part of the network resources. It would be appreciated that optimization of the local allocation attributes, such as the electrical tilt, the mechanical tilt, operating frequencies, and the azimuth may be associated with the signal transceivers, forming a part of the network resources.

The plurality of objectives may include two or more of a pre-defined deployment cost, a pre-defined coverage area, and a pre-defined service-level agreement parameter. Each of the plurality of objectives may correspond to a pre-defined minimum value or a pre-defined maximum value or a pre-defined range of values which needs to be met by the deployment solution. In accordance with the present subject matter, the globally optimal deployment solution is a solution indicative of positions and configurations of the network resources, together, in the service area, such that the plurality of objectives is met. The globally optimal deployment solution is considered to meet the respective objective if the deployment solution achieves at least the pre-defined minimum value, or at most the pre-defined maximum value, or within the pre-defined range of values corresponding to the respective objective. For example, the pre-defined coverage area, may correspond to a pre-defined minimum coverage area to be achieved from the deployment solution, and is considered to be met if the coverage area from the globally optimal deployment solution obtained is at least the pre-defined minimum coverage area. The service-level agreement parameter may include a pre-defined minimum QoS, pre-defined maximum propagation delays, pre-defined maximum transmission delays, pre-defined maximum queuing delays, pre-defined maximum processing delays, a pre-defined minimum service throughput, a pre-defined minimum service utilization, a pre-defined minimum service availability, a pre-defined minimum service capacity, pre-defined maximum call drops, pre-defined maximum data loss, pre-defined maximum jitters, and the like. In an example, the objective of pre-defined call drop rate is met when the number of calls dropped in certain time duration is less than a pre-defined threshold value. The determining of the locally optimal deployment solution may further be based on existing/estimated traffic patterns within the sub-area and requisites for network resource optimization.

In an implementation, the locally optimal deployment solution is determined through a path loss based clustering approach. The determining of the locally optimal deployment solution may be based on one or more parameters which address the plurality of objectives. Such parameters may include a population density, a path loss model, a desirable coverage area, a propagation path loss, a traffic requirement, possible network resource locations, a maximum transmission power, a minimum transmission power, a maximum building height in the service area, a maximum antenna height, an average path loss in the service area, a frequency re-use factor, a frequency of operation, a number of channels, a channel capacity, a maximum erlang capacity, a maximum number of transceiver slots, a minimum receiving threshold power for a subscriber, a minimum receiving threshold power for the pre-determined number of network resources, a call blocking probability, a call drop probability, and a minimum threshold to make successful calls.

After determining the locally optimal deployment solution, a globally optimal deployment solution for allocation of the network resources in the service area is obtained based on the locally optimal deployment solution to meet the plurality of objectives for the network resource optimization. The objectives considered are same as those based on which the locally optimal deployment solution is determined. The globally optimal deployment solution may include one or more global allocation attributes, such as a position, a height, a transmission power, an electrical tilt, a mechanical tilt, a number of sectors, operating frequencies, and an azimuth, of each signal transceivers, for allocation of the network resources in the service area, where the signal transceivers might form a part of the network resources. It would be appreciated that optimization of the global allocation attributes such as the electrical tilt, the mechanical tilt, operating frequencies, and the azimuth may be associated with the signal transceivers forming a part of the network resources.

The globally optimal deployment solution may be obtained by iteratively processing the locally optimal deployment solution based on existing/estimated traffic patterns and pragmatic network conditions in the service area. In an implementation, one of a Genetic Procedural Approach (GPA) and a Cooperative Game Theoretic Approach (CGTA) may be implemented to obtain the globally optimal deployment solution. The globally optimal deployment solution may be based on one or more parameters, such as a number of network resources, a propagation path loss, and an area coverage, which address the plurality of objectives. In an implementation, the parameters considered to obtain the globally optimal deployment solution may differ from the parameters considered while determining the locally optimal deployment solution. However, the plurality of objectives to be met is the same.

The globally optimal deployment solution obtained by implementing the joint optimization method in accordance with the present subject matter, is used to determine if the plurality of objectives for network resource optimization are met by the globally optimal deployment solution. In a scenario, where the globally optimal deployment solution meets the plurality of objectives for network resource optimization, the globally optimal deployment solution may be implemented in the communication network. Here, implementing means either implementing the globally optimal deployment solution directly or providing the globally optimal deployment solution for subsequent implementation. In an implementation, the globally optimal deployment solution may be provided to drive or enable test engineers for further suggestion if necessary. In another scenario, where the globally optimal deployment solution does not meet the plurality of objectives for network resource optimization, the pre-determined number of network resources requisite to service the service area can be modified for further iteration to perform the network resource optimization.

The present subject matter facilitates in obtaining efficient allocation of the network resources, by providing for pre-defined QoS, optimal distribution of the network resources, optimal coverage area, and the like. The present subject matter may also facilitate in minimizing of deployment cost without affecting the subscribers' experience over the communication network. Since, the locally optimal deployment solution obtained for the plurality of sub-areas is iteratively processed to obtain the globally optimal deployment solution, such that the same plurality of objectives are met, the joint optimization method of the present subject matter will be able to provide the globally optimal deployment solution with a reduced number of iterations requisite for convergence to obtain the globally optimal deployment solution.

Additionally, with the present subject matter, the computation time requisite to obtain the globally optimal deployment solution meeting the plurality of objectives is substantially reduced with the implementation of the joint optimization and by maintaining the plurality of objectives as constant while determining the locally optimal deployment solution and obtaining the globally optimal deployment solution. The determining of the locally optimally deployment solution and then obtaining of the globally optimal deployment solution based on the locally optimal deployment solution facilitates in addressing both microscopic variations within the sub-areas and macroscopic variations within the service area.

It would be appreciated by those skilled in the art that the described methods and systems can be implemented to obtain deployment solutions for allocation of the network resources in greenfield communication networks where the communication networks are designed from scratch as well as in the existing communication networks.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and implementations of the subject matter, as well as specific examples thereof, are intended to encompass equivalents thereof.

Figure 2:
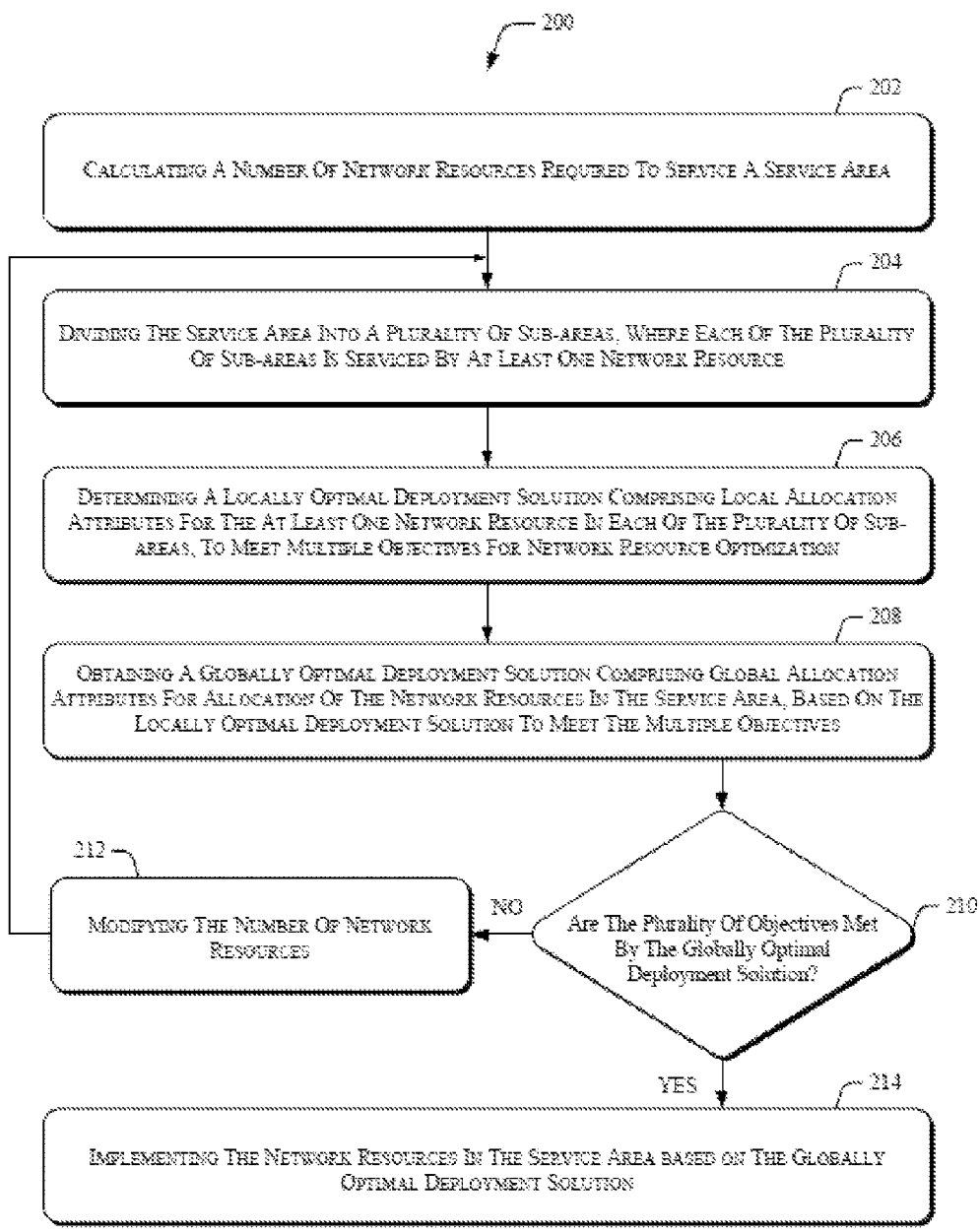
FIG. 2 illustrates a method for network resource optimization in a communication network, in accordance with an implementation of the present subject matter.

The manner, in which the systems and methods may be implemented to enable network resource optimization, shall be explained in details with respect to the FIG. 1-2. While aspects of described systems and methods for enabling network resource optimization in communication networks can be implemented in any number of different computing systems, communication environments, and/or configurations, the implementations are described in the context of the following system(s).

FIG. 1 schematically illustrates a network optimization system 100, in accordance with an implementation of the present subject matter. The network optimization system 100 facilitates optimization of network resources in a service area of a communication network by implementing joint optimization approach, by obtaining a locally optimal deployment solution and iteratively processing the locally optimal deployment solution to obtain a globally optimal deployment solution. The globally optimal deployment solution is obtained by joint optimization approach to meet the plurality of objectives.

The network optimization system 100 may be implemented in a computing device, where the computing device may include, but not limited to, a computer, one or more discrete servers, a mainframe computer, and the like. In accordance with an implementation described herein, network optimization system 100 may provide for network resource optimization in a communication network, such as a GSM network, a UMTS network, a PCS network, a TDMA network, a CDMA network, a NGN, a broadcast network, an IP-based network, and a WiMAX.

The network optimization system 100 includes processor 102. The processor 102 can be a single processing unit or a number of units, all of which could include multiple computing units. The processor(s) may be implemented as one or more microprocessors, microcomputers, micro-controllers, digital signal processors, central processing units, state machines, logic circuitries, and/or any devices that manipulate signals based on operational instructions. Among other capabilities, the processor(s) are to fetch and execute computer-readable instructions stored in the memory. The memory may include any computer-readable medium known in the art including, for example, volatile memory, such as SRAMs and DRAMs and/or non-volatile memory such as EPROMs and flash memories.

Also, the network optimization system 100 includes interface(s) 104. The interfaces 104 may include a variety of software and hardware interfaces that allow the network optimization system 100 to receive and transmit data. Further, the interfaces 104 may enable the network optimization system 100 to communicate with communication and computing devices. The interfaces 104 may facilitate multiple communications within a wide variety of networks and protocol types, including wired networks, for example, LAN, cable, etc., and wireless networks, for example, WLAN, cellular, satellite-based network.

The network optimization system 100 may also include memory 106. The memory 106 may be coupled to the processor 102. The memory 106 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The network optimization system 100 includes modules 108 and data 110. The modules 108 may be coupled to the processor(s) 102. The modules 108 may include routines, programs, objects, components, data structures, and the like, which perform particular tasks or implement particular abstract data types. The modules 108 may further include modules that supplement applications on the network optimization system 100, for example, modules of an operating system. The data 110 serves, amongst other things, as a repository for storing data that may be fetched, processed, received, or generated by one or more of the modules 108. Although the data 110 is shown internal to the network optimization system 100, it may be understood that the data 110 can reside in an external repository (not shown in figure).

In an implementation of the present subject matter, the modules 108 of the network optimization system 100 include an initial network planning module 112, a local optimization module 114, a global optimization module 116, a decision module 118, a planning update module 120, and other module(s) 122. In said implementation, the data 110 of the network optimization system 100 includes initial network planning data 124, local optimization data 126, global optimization data 128, decision data 130, planning update data 132, and other data 134. The other module(s) 122 may include programs or coded instructions that supplement applications and functions, for example, programs in the operating system of the network optimization system 100, and the other data 134 may comprise data corresponding to one or more other module(s) 122.

The description herein describes the network resource optimization by the network optimization system 100 for one service area. A service area may include a geographical region, such as a city, a prefecture, a town, or a locality. The network optimization system 100 may provide optimization of network resources in a service area of a communication network, by implementing an initial network planning, a local optimization, and a global optimization. The network optimization system 100 may iteratively perform the initial network planning, the local optimization of network resources, and the global optimization of the network resources to obtain a globally optimal deployment solution. The network optimization system 100 can optimize the network resources for more than one service area in a similar manner, as described hereinafter.

For the purposes of the initial network planning, the initial network planning module 112 may receive the following: i) parameters associated with objectives for network resource optimization including a pre-defined minimum coverage area, a pre-defined minimum QoS, pre-defined maximum propagation delays, pre-defined maximum transmission delays, pre-defined maximum queuing delays, pre-defined maximum processing delays, a pre-defined minimum service throughput, a pre-defined minimum service utilization, a pre-defined minimum service availability, a pre-defined minimum service capacity, pre-defined maximum call drops, pre-defined maximum data loss, and pre-defined maximum jitters; ii) constraints, such as regulatory guidelines, QoS requirements, feasible network resource locations, maximum number of network resources, and field engineer suggestions, and network resource parameters, such as height, tilt, sectorization, number of transmission slots (TRX) and transmission power; and iii) influence parameters, such as tele-traffic density maps, topographical information, path loss models, population density map. These parameters and constraints are associated with a service area for which the network resources are to be optimized and address a plurality of objectives to be met. The objectives for network resource optimization relate to minimization of deployment cost, achieving a desired coverage area, and meeting one or more SLA parameters. In an implementation, one or more of the above mentioned parameters may be entered by a user operating the network optimization system 100, or may be obtained from an external database (not shown), communicatively coupled with the network optimization system 100. The received parameters are stored in the initial network planning data 124.

Based on one or more of the received parameters and constraints, the initial network planning module 112 computes a number of network resources requisite to service the service area under consideration, such that a plurality of objectives are met. The computed number of network resources is referred to as the pre-determined number of network resources, which is a prerequisite for further processing for network resource optimization by the network optimization system 100. The number of network resources computed may also depend on existing/estimated traffic patterns based on existing/estimated network conditions.

In an implementation, the initial network planning module 112 may further determine an initial deployment solution comprising initial allocation attributes such as a position, a number of sectors and a transmission power, for the number of the network resources computed initially for the communication network. The initial network planning module 112 may yet compute an estimated total service coverage for the service area corresponding to the initial deployment solution.

The description below explains, through an example, the computation of a number of network resources of a telecommunication network requisite to service a service area, for example, a city and the determination of an initial deployment solution for deployment of the number of network resources in the city, by the initial network planning module 112.

In the present example, a COST-231 propagation path loss model is taken into consideration. Based on the drive tests conducted, a modified COST-231 propagation path loss model is developed by adding extra path loss factors to specific geographic locations. A list of feasible Base Station (BS) locations in the city, the modified COST-231 path loss model, a population density map with population density values of the city, QoS requirements and a configurable set of BS parameters such as a height, a tilt, sectorization, a transmission power, a receiving threshold power (rtp), and a number of TRX slots are provided as an input to the initial network planning module 112. The input may be stored in the initial network planning data 124.

In an implementation, the initial network planning module 112 pre-computes the BS cell design for each possible candidate BS. The BS cell design may include coverage attributes of the BSs, such as estimated service coverage of the BS. The initial network planning module 112 may store the information associated with the pre-computed BS cell design in the initial network planning data 124. The initial network planning module 112 may compute an initial deployment solution including, BS cell design based on the input, as described below.

In said example, the population density values are assumed to be a direct measure of the tele-traffic density generated in the city. Initially, a service coverage is estimated for each feasible BS location based on the inputs provided. The antenna heights, the tilts, and the number of TRX slots are set to relevant practical values. Based on the relevant practical values set, the minimum transmission power requisite and the number of sectors for each BS is configured.

Further, in the said example, the population density values may be scaled down by a factor of 100 for computation simplicity. Initially, all feasible BS locations in the city are accumulated into a candidate BS set C represented as:

$$C=\{c_i\}; i=1,2,\ldots X \quad (1)$$

where, X represents a total number of feasible BS locations, and $c_i$ represents a geographic location of $i^{th}$ BS. Each BS may also be tagged with a unique identification attribute or index. In an example, BSs are serially numbered or tagged with indexes from 1 to X.

Existing population patterns from the population density maps are analyzed to predict future population values in the city. For computation simplicity, a predicted population P is clustered into demand nodes (DNs), where each demand node represents a pre-defined number of users n on the telecommunication network in the city. A DN set D is obtained based on the pre-defined number of users n.

$$D = \{d_j\}; \quad (2)$$
$$j = 1, 2, \ldots Y$$

$$Y = \frac{P}{n} \quad (3)$$

where, Y represents a total number of DNs obtained, and $d_j$ represents $j^{th}$ DN. Note that, in absence of the population density map, market observations and prospective or active user density in the desired city or service area may be used to obtain the demand nodes.

Further, for t number of TRX slots in a BS and a traffic capacity $t_{traffic}$ of each TRX slot, a total traffic capacity $Cap_i$ of the $i^{th}$ BS is determined as:

$$Cap_i = t * t_{traffic} \quad (4)$$

However, for computation simplicity, it is assumed that all the BSs are similar and the capacity of each is limited to Cap. Further, an approximate number of BSs N requisite to service the city, is obtained with a blocking probability $p_b$ and a total estimated traffic T. The number of BSs N is given by:

$$N = \frac{T*(1-p_b)}{Cap} \quad (5)$$

where, $\quad (6)$
$T = P * U$, and where, P represents total predicted subscriber population, and U represents average per user traffic in Erlang, obtained from tele-traffic studies.

Since the service coverage of BSs is dependent on local traffic patterns and network conditions, the value of N thus, obtained is an approximate minimum number of BS requisite for complete service coverage. The service coverage for each BS is determined and quantified with path loss calculations based on the transmission power and the rtp. The transmission power $P_{TX}$ of each BS is configured optimally so that the above determined service coverage is within the capacity limit Cap. For determining and quantifying the service coverage for each BS, a coverage set CS and multiple coverage set MCS are determined as:

$$CS=\{\delta_{ij}\}; i=1,2,\ldots X, j=1,2,\ldots Y \quad (7)$$

where, $\delta_{ij}$ is 1 if the $i^{th}$ BS at $c_i$ covers DN $d_j$ and is 0 otherwise;

$$MCS=\{\mu_{ij}\}; i=1,2,\ldots X, j=1,2,\ldots Y \quad (8)$$

where, $\mu_{ij}$ is 1 if DN $d_j$ is covered by more than 1 BS and is 0, otherwise.

Further, since the coverage set CS represents the DNs covered by each BS and the multiple coverage set MCS represents DNs covered by multiple BSs, the coverage values for each BS is obtained as:

$$A_i = \Sigma_{j=1}^{Y}[\delta_{ij}] \quad (9)$$

where, $A_i$ represents total DN coverage of the $i^{th}$ BS at $c_i$.

Further, the number of sectors S, representing number of portions of the area serviced by each BS can now be calculated as:

$$S_i = \left\lceil \frac{A_i * n * U}{t' * t_{traffic}} \right\rceil \quad (10)$$

where, t' is the number of TRX per sector and $t_{traffic}$ is the capacity of each TRX, $S_i$ represents the number of sectors for the $i^{th}$ BS. The value of number of sector S is rounded to the nearest higher integer. Note that the number of sectors per BS is practically constrained, usually 2 to 4 sectors per BS are of use. If the number of sectors obtained by the equation (10) exceeds 4, then preferably one or more BS should be added and the total number BSs should be N+1 or so. Accordingly, the number of BSs N requisite to service the city is determined.

The objective functions and constraints for the above mentioned optimization problem are tabulated as follows:

| Objective | Description |
| --- | --- |
| min[N] | N : number of Base Stations |
| $\min\sum_{k=1}^{N} E_k$ | $E_k$ : total cost [Capital Expenditures (CAPEX) and Operational Expenditures (OPEX)] associated with $k^{th}$ BS in the initial deployment solution |
| $\max\sum_{k=1}^{N} A_k$ | $A_k$ : total service coverage provided by $k^{th}$ BS in the initial deployment solution |

TABLE 2

| Constraint | Description |
| --- | --- |
| $SINR_{jk} \geq SINR_{th} \forall j, k$ | $SINR_{jk}$: Signal to Interference Noise Ratio experienced by $j^{th}$ DN when covered by $k^{th}$ BS in the deployment solution |
| $P_{Tx_k} \leq P_{Tx_{max}}$; $h_k \leq h_{max}$; $Q_{TRX_k} \leq Q_{TRX_{max}}$; $\forall k$ | Constraints on maximum transmission power, BS height and number of transceiver slots, respectively for each BS |
| $KPI_{jk}^a \leq KPI_{max}^a \, \forall j, k, a$ | Constraint on each maximum limit Key Performance Indicator (indexed by a), such as call drop rate, call outage and the like, experienced by $j^{th}$ DN, when covered by $k^{th}$ BS in deployment solution. |
| $KPI_{jk}^{a'} \geq KPI_{min}^{a'} \forall j, k, a'$ | Constraint on each minimum limit Key Performance Indicator (indexed by a'), such as handover success rate, connection establishment success rate and the like, experienced by $j^{th}$ DN when covered by $k^{th}$ BS in deployment solution. |

Based on the above mentioned computations, the initial network planning module 112 formulates the initial deployment solution including various computed parameters and positions and configurations of the N number of network resources.

It is to be noted that network resource optimization is a multi-objective constraint based optimization problem in which the objective functions and the constraints conflict with each other. Several geographical parameters, such as the population density, building types, road types, vegetation, elevated land/hillocks, and the like, are non-uniformly distributed and vary significantly over different service areas. Besides, the pragmatic traffic conditions are generally, time and location dependent for the service areas. This elusive inherent dependence should be effectively addressed by providing solutions that are optimal to the network conditions from a local as well as a global perspective. Therefore, instead of solving the above mentioned optimization problem for the entire service area, the service area is divided into smaller segments of uniform clutter and tele-traffic density, i.e. sub-areas, and optimal deployment solutions for the smaller segments are obtained independently. This is equivalent to dividing the global problem into a set of local problems where optimization is sought. The optimal deployment solutions obtained for the smaller segments form the locally optimal deployment solution. Further, a global optimization can be attempted, considering the locally optimal deployment solution as a knowledge set. This method of joint optimization can lead to a near optimal deployment solution.

In an implementation, for the purpose of the local optimization, the local optimization module 114 receives the number of network resources (as the pre-determined number) requisite to service the service area, from the initial network planning module 112. The local optimization module 114 may also receive the initial deployment solution, including the pre-computed BS cell design from the initial network planning module 112, for allocation of the network resources in the service area. In an implementation, the local optimization module 114 may also retrieve the pre-computed BS cell design from the initial network planning data 124.

In an implementation, the local optimization module 114 then divides the service area in to a plurality of sub-areas, where each of the plurality of sub-areas can be serviced by at least one network resource from the pre-determined number of network resources for the service area. The dividing of the service area in to the plurality of sub-areas may be based on distribution of DNs within the service area, wherein each DN corresponds to a pre-determined number of users on the communication network. In an implementation, the DN may correspond to a single user. In situations where the pre-determined number of users is more than one the computation for allocation of the network resources, is simplified. The dividing of the service area into the plurality of sub-areas may also be such that the distribution of a total estimated/existing traffic among each of the plurality of sub-areas is substantially uniform. The non-uniformity in the distribution of DNs within the service area may be considered during the division of the service area.

Further, the local optimization module 114 determines a locally optimal deployment solution, where the locally optimal deployment solution includes one or more local allocation attributes, such as a position, a height, a transmission power, an electrical tilt, a mechanical tilt, a number of sectors, operating frequencies, and an azimuth of the signal transceivers, individually, in each of the sub-areas, where the signal transceivers form a part of the network resources. The determining of the locally optimal deployment solution may be such that a plurality of objectives for the network resource optimization are met. The plurality of objectives may include two or more of a pre-defined cost, a pre-defined minimum coverage area, and a pre-defined service-level agreement parameter, such as a pre-defined minimum QoS, pre-defined maximum propagation delays, pre-defined maximum transmission delays, pre-defined maximum queuing delays, pre-defined maximum processing delays, a pre-defined minimum service throughput, a pre-defined minimum service utilization, a pre-defined minimum service availability, a pre-defined minimum service capacity, pre-defined maximum call drops, pre-defined maximum data loss, pre-defined maximum jitters. In an implementation, the local optimization module 114 determines the locally optimal deployment solution based on the BS cell design, pre-computed by the initial network planning module 112. The determining of the locally optimal deployment solution, based on the pre-computed BS cell design may substantially reduce the computation time. In an implementation, the local optimization module 114 may identify whether the locally optimal deployment solution meets the plurality of objectives, to obtain the globally optimal deployment solution. The local optimization module 114 stores the locally optimal deployment solution in local optimization data 126.

The determining of the locally optimal deployment solution may further, be based on existing/estimated traffic patterns within the sub-area. The locally optimal deployment solution may also be determined, based on one or more of a population density, a path loss model, a coverage area, a propagation path loss, a traffic requirement, possible network resource locations, a maximum transmission power, a minimum transmission power, a maximum building height in the service area, a maximum antenna height, an average path loss in the service area, a frequency re-use factor, a frequency of operation, a number of channels, a channel capacity, a maximum Erlang capacity, a maximum number of transceiver slots, a minimum receiving threshold power for a subscriber, a minimum receiving threshold power for the pre-determined number of network resources, a call blocking probability, a call drop probability, a minimum threshold to make successful calls, and a minimum desired coverage.

In an implementation, the local optimization module 114 may utilize local threshold values, corresponding to one or more of the plurality of objectives to determine the locally optimal deployment solution. The local threshold values may correspond to initial deployment solution and deployment solutions obtained from each iteration performed, to determine the locally optimal deployment solution. The local threshold values may either have a minimum value, or a maximum value, or a range of values corresponding to each of one or more of the plurality of objectives. The local optimization module 114 may make decisions based on the local threshold values and corresponding values achieved by the deployment solution. For example, for one of the plurality of objectives, 'coverage area', the objective may be set at 90%. In such a scenario, the local threshold values, corresponding to the pre-defined coverage may be defined to be 70%, 80% and 85% in corresponding iterations 1-5, 6-10, and 11-100, respectively.

It should be noted that the local threshold values are for the purpose of decision making, by the local optimization module 114 for the obtained intermediate deployment solutions. In such a process of decision making, the plurality of objectives for the network resource optimization may remain the same, that is, the pre-defined coverage area of 90% may be unaltered. Based on the local threshold values and corresponding values achieved by the deployment solution, the local optimization module 114 may decide whether to proceed to further iteration or, to re-perform the initial network planning. The convergence of the local optimization to obtain the locally optimal deployment solution may depend on the local threshold values.

In an implementation, a Path loss Based Clustering Approach (PBCA) may be used to divide the service area into a plurality of sub-areas and determine the locally optimal deployment solution. The local optimization module 114 may provide the locally optimal deployment solution to the global optimization module 116 for further processing.

The description below, describes the procedure of division of the service area into the sub-areas and determination of locally optimal deployment solution through the PBCA by way of an example. In an implementation, the service area is divided into the plurality of sub-areas, where each of the plurality of sub-areas may correspond to a group of DNs and is serviced by a network resource. In the PBCA, local network conditions are taken into account while dividing the service area. The PBCA may start with an initial set of cluster centers, chosen at random or according to a heuristic procedure or the initial deployment solution obtained from the initial network planning module 112. Assuming a network resource to be at each cluster center, each DN is mapped to a cluster center so that, the DN experiences the least possible propagation path loss. The cluster centers of the clusters are, accordingly re-calculated and updated to obtain the least possible propagation path loss for the DNs. The PBCA continues iteratively, to re-calculate and update the cluster centers until an update in the cluster centers influences no substantial change in the propagation path loss for the DNs.

To elaborate the process followed in the PBCA, the candidate BS set C, the DN set D, and the number of BSs, N are provided as inputs. The cluster centers, PBC are initialized as:

$$PBC=\{p_i\}; i=1,2,\ldots N \quad (11)$$

where, $p_i$ represents $i^{th}$ cluster center adjusted to a nearest candidate BS location in C. Each of the cluster centers $p_i$ is indicative of the location of the associated BS. The cluster centers, PBC are initialized, based on the initial deployment solution obtained from the initial network planning module 112 or a heuristic procedure. The propagation path losses observed is computed as:

$$PL=\{l_{ij}\}; i=1,2,\ldots (N), j=1,2,\ldots Y \quad (12)$$

where, $l_{ij}$ represents propagation path loss observed at $d_j$ when the corresponding BS is at $p_j$.

Further, a cluster set $b_i$ that map the DNs to respective element $p_i$ in PBC is formulated based on the values in the propagation path loss PL as:

$$b_i=\{d_j|l_j=\min[l_{1j},l_{2j},\ldots l_{(N-1)j},l_{Nj}]\}; i=1,2,\ldots N \quad (13)$$

where, $b_i$ represents set of DNs that experience least path loss values when transmitted from $p_i$.

Based on each cluster set $b_i$, centroids $q_i$ to DNs in the each cluster set $b_i$ is computed as:

$$q_i=\text{centroid}(d_i \epsilon b_i) \quad (14)$$

where, $q_i$ represents updated $i^{th}$ cluster center adjusted to nearest BS location in C. Based on this, the cluster centers PBC is updated to PBC' as:

$$PBC'=\{q_i\}; i=1,2,\ldots N \quad (15)$$

Now, for the updated cluster centers PBC', path loss PL' and cluster sets $b_i'$ are computed as described above through equations (12) and (13) respectively. If no DN changes its cluster following an update in the cluster centers, PBCA is terminated by making an assignment of the cluster sets $b_i'$ as:

$$b_i'=b_i; i=1,2,\ldots N \quad (16)$$

Further, the PBCA may also be terminated after a local threshold value is met or after, a pre-determined number of maximum iterations have been reached. In case, if any of the DN changes its cluster following the update in the cluster centers, respective element $p_i$ in PBC is updated to the respective element $q_i$ in PBC' as follows:

$$p_i=q_i; i=1,2,\ldots N \quad (17)$$

and the PBCA continues iteratively, to compute propagation path loss PL, formulate cluster set $b_i$ that map DNs to respective element $p_i$ in PBC based on the path loss PL, computes centroids to DNs in each $b_i$, update the cluster centers to PBC', and update the elements $p_i$ in the PBC as shown in equations (12), (13), (14), (15), (16), and (17), respectively, until there is no DN that changes its cluster following an update in the cluster centers or until the local threshold value is not met or until the pre-determined number of maximum iterations has not been reached The values of sets $b_1'$ and $q_i$, at the termination of the PBCA, form a part of the locally optimal deployment solution. The locally optimal deployment solution also includes one or more local allocation attributes of the BSs governed by the $q_i$. The local optimization module 114 may then, provide the locally optimal deployment solution to the global optimization module 116 for further processing.

In another implementation, the local optimization module 114 may divide the service area in to plurality of sub-areas, where each of the plurality of sub-areas can be serviced by more than one network resource. The number of network resources, for servicing one sub-area, may be based on user preference or computation time requirement for the network resource allocation. In situation, where the each of the plurality of sub-areas can be serviced by multiple network resources, methodologies described in the description, herein, may be used to obtain locally optimal deployment solution for the allocation of the multiple network resources within the respective sub-area.

For the purpose of the global optimization, in an implementation, the global optimization module 116 iteratively, processes the locally optimal deployment solution to obtain the globally optimal deployment solution for the service area. The globally optimal deployment solution includes one or more global allocation attributes, such as a position, a height, a transmission power, an electrical tilt, a mechanical tilt, a number of sectors, operating frequencies, and an azimuth of the signal transceivers in the entire service area, where the signal transceivers form part of the network resources. The iterative processing of the locally optimal deployment solution is performed to meet the plurality of objectives that are same as those considered for the determination of the locally optimal deployment solution. The obtaining of the globally optimal deployment solution may further, be based on existing/estimated network conditions in the service area. In an implementation, the global optimization module 116 may obtain the globally optimal deployment solution based on the BS cell design, pre-computed by the initial network planning module 112. The obtaining of the globally optimal deployment solution based on the pre-computed BS cell design may substantially reduce the computation time. In an implementation, the obtaining of the globally optimal deployment solution may be based on identifying whether the locally optimal deployment solution meets the plurality of objectives or not. The global optimization module 116 stores the globally optimal deployment solution in the global optimization data 128.

In an implementation, the global optimization module 116 may utilize global threshold values corresponding to one or more of the plurality of objectives to obtain the globally optimal deployment solution. The global threshold values may correspond to deployment solutions obtained from each iteration performed, to obtain the globally optimal deployment solution.

The global threshold values may either have a minimum value, or a maximum value, or a range of values corresponding to each of one or more of the plurality of objectives. The global optimization module 116 may make decisions based on the global threshold values and corresponding values achieved by the deployment solution. It should be noted that the global threshold values are for the purpose of decision making by the global optimization module 116, for the intermediate obtained deployment solutions. In such scenarios, the plurality of objectives for the network resource optimization may remain the same. Based on the global threshold values and corresponding values achieved by the deployment solution, the global optimization module 116 may decide, whether to proceed to further iteration or, to re-perform the initial network planning. The convergence of the global optimization to obtain the globally optimal deployment solution may depend on the global threshold values.

The convergence of the joint optimization to obtain the globally optimal deployment solution may depend on the local threshold values and the global threshold values corresponding to the plurality of objectives utilized by the local optimization module 114 and the global optimization module 116, respectively.

To illustrate the functionality of the global optimization module 116, two example implementations to obtain the globally optimal deployment solution are provided below.

In an example, the global optimization module 116 may follow the Genetic Procedural Approach (GPA) implementing genetic procedural operations such as crossover and mutation iteratively over a group of potential BS deployment solutions (population), so as to generate a better service coverage at the end of each iteration. A BS deployment solution is a group of BSs, requisite to service the service area. In each iteration of the GPA, fitness values are assigned to each BS deployment solution in a population G, comprising Z number of BS deployment solutions, based on the coverage values provided. BS deployment solutions are then, selected from the population for genetic operations based on fitness values. Mutation and crossover operations are applied to the selected BS deployment solutions to engender a new population MG. To perform the next iteration, Z' most fit BS deployment solutions are extracted from the entire available population, i.e. G and MG. The process is continued iteratively, until an optimal BS deployment solution conforming to the target service coverage is obtained. The optimal BS deployment solution thus, obtained is the final output of the global optimization module 116.

To elaborate this in detail, a BS deployment solution can be represented as vectors concatenating binary representations of indices of the BSs in the feasible BS set C. The BS deployment solution is thus, represented as:

$$B = [v_1 v_2 v_3 \ldots v_N] \quad (18)$$

where, N represents number of BSs selected into the BS deployment solution B and $v_i$ is a binary representation of the index (a characteristic number) corresponding to $i^{th}$ BS.

For example, let the number of BS N selected into a BS deployment solution B be 3, and selected BS have indices as 21, 126, 250 from feasible BS set C comprising 256 locations. Then, the BS deployment solution B is given by:

$$B = [v_1 v_2 v_3] = [00010101 01111110 11111010] \quad (19)$$

where, $v_1 = [00010101]$, $v_2 = [01111110]$, and $v_3 = [11111010]$.

For obtaining the optimal BS deployment solution from the Z number of BS deployment solutions, the candidate BS set C, the DN set D, the requisite number of BSs N, the coverage set CS, and the multiple coverage set, MCS as represented in equations, (1), (2), (5), (7), and (8), respectively, are provided as inputs along with a crossover probability $\alpha$, a mutation probability $\beta$, an initial parental population G, comprising Z BS deployment solutions, a minimum coverage desired $A_{th}$, and a maximum number of iterations $gen_{th}$. For example, Z may be 50. The locally optimal deployment solution for N number of BSs may be provided as one of the potential BS deployment solutions. In an implementation, the population G may be obtained, by generating m replicas of the locally optimal deployment solution and (Z–m) randomly generated deployment solutions. The value of m is pre-defined and may vary from 0 to Z. The globally optimal deployment solution comprising the optimal BS deployment solution $BS_{opt}$ and one or more global allocation attributes for the network resources, in accordance with, the optimal BS deployment solution $BS_{opt}$, is obtained through the GPA as described below.

The number of generations gen (iteration number) is initialized to zero. For the first iteration, coverage values $A_m$ and $M_m$ for each $m^{th}$ BS deployment solution $B_m$ in the initial parental population G, and a maximum coverage $A_{max}$ for all the BS deployment solutions in the initial parental population G, are calculated as:

$$A_m = \Sigma_{k=1}^{N} \Sigma_{j=1}^{Y} (\delta_{B_m[k]j}) \quad (21)$$

$$A_{max} = \max[A_m, m=1,2 \ldots Z] \quad (22)$$

$$M_m = \Sigma_{k=1}^{N} \Sigma_{j=1}^{Y} (\mu_{B_m[k]j}) \quad (23)$$

where, $A_m$ represents total number of DNs covered by $B_m$, and $M_m$ represents total number of multiple DNs covered by $B_m$. In case, if the maximum coverage $A_{max}$ is greater than or equal to the minimum coverage desired $A_{th}$, the GPA terminates by providing the optimal BS deployment solution $BS_{opt}$, as the BS deployment solution corresponding to $A_m$ that represents the maximum coverage $A_{max}$.

If the maximum coverage $A_{max}$ is less than the minimum coverage desired $A_{th}$, higher fitness values are assigned to BS deployment solutions covering higher number of singly covered DNs. Mathematically, the fitness values are determined as follows:

$$f_m = w_1 * A_m + w_2 * M_m \quad (24)$$

where, $f_m$ represents fitness value assigned for $BS_m$, $w_1$ represents weight value for DNs singly covered by $B_m$, and $w_2$ represents weight value for DNs multiply covered by $B_m$. For example, $w_1=1$ and $w_2=-0.4$ assigns 100% priority to singly covered DNs and 40% penalty to DNs covered by multiple BSs, respectively. It is to be noted that lower penalization to multiple covered DNs result in frequent handoffs in a densely populated area.

A new set of Z BS deployment solutions are selected from the initial parent population G, based on fitness values. For a $B_m$, with a fitness value $f_m$, the probability of the $m^{th}$ BS deployment solutions being selected into the new set of Z BS deployment solutions is given by:

$$P_m = \frac{f_m}{\sum_{m=1}^{Z} f_m} \quad (25)$$

The population G is reset to the new set of Z BS deployment solutions, and the number of generations gen (iteration number) is incremented by one.

Now, a crossover operation is applied to BS deployment solutions in the population G with a probability $\alpha$ to yield an offspring population H based on the following equations:

$$BS_k(\text{Parent1}) = [v_{k1} v_{k2} \ldots v_{kq} v_{k(q+1)} \ldots v_{kN}] \quad (27)$$

$$BS_l(\text{Parent2}) = [v_{l1} v_{l2} \ldots v_{lq} v_{l(q+1)} \ldots v_{ln}] \quad (28)$$

$$CBS_r(\text{Offspring1}) = [v_{k1} v_{k2} \ldots v_{kq} v_{l(q+1)} \ldots v_{ln}] \quad (29)$$

$$CBS_s(\text{Offspring2}) = [v_{l1} v_{l2} \ldots v_{lq} v_{k(q+1)} \ldots v_{ln}] \quad (30)$$

$$H = \{CBS_i\}; i=1,2,\ldots h \quad (31)$$

where, q represents the crossover point and h represents the total number of BS solutions obtained from crossover operation.

After this, a mutation operation is applied to the obtained offspring population H with a probability $\beta$, to obtain a mutated offspring population M based on the following equations:

$$v_k = [10\ 000\ 11000] \quad (32)$$

$$v'_k = [10\ 000\ 11100] \quad (33)$$

$$M = (CBS'_i); i=1,2,\ldots h \quad (34)$$

where, $v_k$ in an offspring BS solution $CBS_i$ represents a BS index, for example, 536 in the feasible BS set C, comprising a total of, for example, 1024 BS locations; $v'_k$ represents a new BS solution $CBS'_i$ generated by flipping a random digit in $v_k$ by applying a mutation probability $\beta$, and M represents a new population, obtained by applying mutation to all the offspring BS solutions in H.

After this, the mutated offspring population M and the parent population G are combined to obtain a new population MG, containing a total of Z' number of BS deployment solutions as follows:

$$MG = \{CBS'_i\}; i=1,2\ldots Z' \quad (35)$$

While the number of generations gen is less than the maximum number of iterations $\text{gen}_{th}$, coverage values of each BS deployment solution in the new population MG are calculated and the BS deployment solutions with Z best coverage values are chosen as the parent population G for the next generation (next iteration). Also $A_{max}$ is reset to the maximum coverage achieved, using the Z' number of BS deployment solutions in MG as:

$$A_{max} = \max[A_m, m=1,2\ldots Z'] \quad (36)$$

If the number of generations gen becomes equal to the maximum number of iterations $\text{gen}_{th}$, or $A_{max}$ becomes greater than or equal to a pre-determined global threshold value, the GPA terminates by providing the BS deployment solution corresponding to $A_m$ that represents the maximum coverage $A_{max}$ as optimal BS deployment solution $BS_{opt}$. This optimal BS deployment solution $BS_{opt}$ is the globally optimal deployment solution obtained by the global optimization module 116.

In another example, the global optimization module 116 may follow the Cooperative Game Theoretic Approach (CGTA) to iteratively process the locally optimal deployment solution to obtain the globally optimal deployment solution. As described, the globally optimal deployment solution may include one or more global allocation attributes, such as a position, a height, a transmission power, an electrical tilt, a mechanical tilt, a number of sectors, operating frequencies, and an azimuth of the signal transceivers in the service area, where the signal transceivers form a part of the network resources. The CGTA implements a cooperative game designed, such that network resources (players), such as BSs, move across the service area, with all the network resources (players) adopting a common strategy of maximizing the service coverage. Further, a sequential play concept is introduced in which at any point of time, one network resource (a player) can make a move to another location and each of the other network resources (other players) has complete information about the positions of the other network resources. Further, a visibility concept is introduced, in which for a player at a given position, service area within a certain radius r (visibility radius) is visible. For computation simplicity, players can move within the visible regions only. For example, r may be chosen as 25% of a linear dimension of the service area. A network resource (a player) is said to 'pass-off' the game to the next network resource (next player), if it cannot move to a better location, where the better location results in better service coverage, in the service area. The game is said to reach equilibrium, if all the network resources (players) 'pass-off' the game. The CGTA is explained in detail below.

The candidate BS set C, the DN set D, the requisite number of BSs N, the coverage set CS, and the multiple coverage set, MCS as represented in equations, (1), (2), (5), (7), and (8), respectively, and the visibility radius r, are provided as inputs along with a minimum coverage desired $A_{th}$, and an initial BS deployment solution B. The initial BS deployment solution B is the locally optimal deployment solution obtained from the local optimization module 114. The CGTA determines all possible moves that can be made by a BS in the service area. To each BS deployment solution resulting from a possible move, payoff values are assigned based on coverage values. With the knowledge of payoff values of resulting BS deployment solutions, the BS makes a move that results in the highest payoff BS deployment solution possible. All the BSs make sequential moves in similar fashion to yield higher payoff BS deployment solutions as the game progresses. This process continues iteratively, until no BS can make a payoff enhancing move. Optimal BS deployment solution thus, obtained, is the globally optimal deployment solution comprising allocation attributes for the network resources. The details of obtaining the globally optimal deployment solution through the CGTA, are described in detail below.

Initially, a pass vector is initialized to N zeroes, by assuming all of the requisite number of BSs N to be in non-equilibrium state initially. The initialized pass vector is denoted as:

$$\text{pass}=[0\ 0\ 0\ \ldots\ ]; \quad (37)$$

As long as equilibrium is not reached, i.e. pass vector is not N ones, all the N BSs are iteratively processed sequentially to move to higher payoff position possible to obtain the optimal BS deployment solution as described below.

For each BS, let's say the $i^{th}$ BS, a set L comprising all BS locations to which the $i^{th}$ BS can move is created, based on the visibility radius r as follows:

$$L=\{l_i\}; i=1,2\ldots m \quad (38)$$

where, m represents total number of BS locations into which the $i^{th}$ BS can move.

After this, a possible BS deployment solution set Q is created by replacing the $i^{th}$ BS in the initial BS deployment solution B with elements in L. For this, let's say the initial BS deployment solution B is represented as:

$$B=(p_1 p_2 \ldots p_i p_{i+1} \ldots p_N) \quad (39)$$

The possible BS deployment solutions are then given by:

$$PB_1=(p_1 p_2 \ldots l_1 p_{i+1} \ldots p_N)$$

$$PB_2=(p_1 p_2 \ldots l_2 p_{i+1} \ldots p_N)$$

$$PB_m=(p_1 p_2 \ldots l_m p_{i+1} \ldots p_N) \quad (40)$$

The possible BS deployment solution set Q is then given by:

$$Q=(PB_i); i=1,2,\ldots m \quad (41)$$

After this, payoff values $f_i$ are assigned to each BS deployment solution $PB_i$ in Q as:

$$f_i = w_1 * A_i + w_2 * M_i; i=1,2,\ldots m \quad (42)$$

$$A_i = \Sigma_{k=1}^{N} \Sigma_{j=1}^{Y} (\delta_{PB_i[k]j}) \quad (43)$$

$$M_i = \Sigma_{k=1}^{N} \Sigma_{j=1}^{Y} (\mu_{PB_i[k]j}) \quad (44)$$

where, $A_i$ represents total number of DNs covered by solution $PB_i$, M represents total number of DNs covered multiple times by solution $PB_i$, and $w_1$ and $w_2$ are the weight values for DNs singly covered and multiply covered by $PB_i$. For example, $w_1=1$ and $w2=-0.4$ assigns 100% priority to singly covered DNs and 40% penalty to DNs covered by multiple BSs, respectively. It is to be noted that lower penalization to multiple covered DNs result in frequent handoffs in a densely populated area. Similarly, payoff value $f_0$ is assigned to initial BS deployment solution B.

After this, it is checked if the $i^{th}$ BS can be moved to a higher payoff position, by checking whether the $i^{th}$ BS is already in the highest payoff position or not. The $i^{th}$ BS is in the highest payoff position if the following is true:

$$f_0 = \max(f_0, f_1, f_2, \ldots f_m) \quad (45)$$

In case, if the $i^{th}$ BS is in the highest payoff position, the corresponding $i^{th}$ value in the pass vector is changed from zero to one as:

$$\text{pass}(i)=1; \quad (46)$$

In case, if the $i^{th}$ BS is not in the highest payoff position, the initial BS deployment solution B is replaced by one of the possible BS deployment solutions as:

$$B=PB_i | f_i = \max(f_0, f_1, f_2, \ldots f_m) \quad (47)$$

The BSs are moved to respective highest payoff positions until all the N values in the pass vector become one, i.e. until the equilibrium is reached or until the global pre-determined threshold value is met or until a maximum number of BS moves are reached. The coverage value $A_{max}$ for the finally obtained BS deployment solution B is computed as follows:

$$A_{max} = \Sigma_{k=1}^{N} \Sigma_{j=1}^{Y} (\delta_{B[k]j}) \quad (48)$$

Further, in an implementation, the globally optimal deployment solution, obtained by the global optimization module 116, may be sent to the decision module 118 for verification purpose. The decision module 118 verifies if the globally optimal deployment solution meets the plurality of objectives. In the situation, where the objectives are met by the globally optimal deployment solution, the network resources can be deployed, based on the globally optimal deployment solution. In the situation, where the objectives are not met by the globally optimal deployment solution, the decision module 118 may notify the planning update module 120 to modify the pre-determined number of network resources requisite for servicing the service area.

In an implementation, the decision module 118 may check if the overall objectives achieved by the globally optimal deployment solution are better by a pre-defined quantity, for example by 5%, than meeting the plurality of objectives. If so, then the decision module 118 may notify the planning update module 120 to reduce the pre-determined number of network resources requisite for servicing the service area. The notification by the decision module 118 to modify the pre-determined number of network resources may further, be based on pre-determined feasible signal transceivers, where the pre-determined feasible signal transceivers is pre-computed. This modifying of the pre-determined number of network resources, based on the pre-determined feasible signal transceivers facilitates consideration of coverage information at the local optimization module 114 and at the global optimization module 116. The pre-defined quantity may be stored in the decision data 130. The pre-defined quantity may be defined by the user.

It would be understood by the person skilled in the art that, in an implementation, the global optimization module 116 may send values corresponding to the plurality of objectives, obtained from the globally optimal deployment solution, for example $A_{max}$ obtained from the globally optimal deployment solution, based on which verification can be made by the decision module 118.

The planning update module 120 may receive notifications from the decision module 118, to modify the pre-determined number of network resources requisite for servicing the service area. The notification from the decision module 118 may be to increase the pre-determined number of network resources. In such a scenario, the planning update module 120 may increase the requisite number of network resources N by a pre-defined value, for example 1, and provide the revised number of network resources to the local optimization module 114, in order to obtain the locally optimal deployment solution and, thereby, the globally optimal deployment solution based on the procedure described above. The pre-defined value may be stored in the planning update data 132. The pre-defined value may be set by the user.

In another scenario, the notification from the decision module 118 may be to decrease the pre-determined number of network resources. In such a scenario, the planning update module 120 may decrease the requisite number of network resources N, by a pre-defined value, for example 1, and provide the revised number of network resources to the local optimization module 114, in order to obtain the locally optimal deployment solution and, thereby, the globally optimal deployment solution based on the procedure, described earlier.

In an implementation, the local optimization module 114 and the global optimization module 116 may utilize the BS cell design, pre-computed by the initial network planning module 112, to determine the locally optimal deployment solution and obtain the globally optimal deployment solution, respectively. The utilization of the pre-computed BS cell design by the local optimization module 114 and the global optimization module 116 can reduce the computation time to obtain the globally optimal deployment solution.

In an example of the present subject matter, the network optimization system 100 was implemented to optimize the network resources for a telecommunication network in a city with the parameters listed in Table 3.

TABLE 3

| Input Parameters | Input Values |
| --- | --- |
| Frequency of Operation | 900 MHz |
| Maximum Traffic Requirement | 270 Erlang |
| Maximum number of Transceiver (TRX) per BS | 12 (4 + 4 + 4) |
| Blocking Probability ($p_b$) | 0.01 |
| Maximum Transmission Power of BS ($P_{Txmax}$) | 20 W per antenna |
| Receiving Threshold Power (rtp) for subscribers | −100 dBm |
| Minimum desired coverage | 90% |

The procedure of network resource optimization, as described in the description herein, was carried out and four deployment solutions were obtained. A first deployment solution was obtained by performing a random solution generation and followed by the GPA. A second deployment solution was obtained by performing a random solution generation and followed by the CGTA. A third deployment solution was obtained by the joint optimization approach, according to an implementation of the present subject matter, by performing the PBCA for the local optimization and performing the GPA for the global optimization. Further, another (fourth) deployment solution was obtained by the joint optimization approach, according to an implementation of the present subject matter, by performing the PBCA for the local optimization and performing the CGTA for the global optimization.

For all the cases, the requisite number of network resources N was obtained to be 15. The first deployment solution resulted in a coverage area of 90.65% and the computation time taken was 10724 seconds. The second deployment solution resulted in a coverage area of 90.41% and the computation time taken was 196 seconds. The third deployment solution resulted in a coverage area of 91.03% and the computation time taken was 10688 seconds. The fourth deployment solution resulted in a coverage area of 91.65% and the computation time taken was 154 seconds. The observations corresponding to the deployment solutions 1, 2, 3 and 4 are tabulated below:

TABLE 4

| | Deployment solution obtained without joint optimization | | Deployment solution obtained by joint optimization | |
| --- | --- | --- | --- | --- |
| Observation | I GPA | II CGTA | III PBCA-GPA | IV PBCA-CGTA |
| Number of BS requisite (N) | 15 | 15 | 15 | 15 |
| Coverage Obtained (%) | 90.65 | 90.41 | 91.03 | 91.65 |
| Simulation Time (sec) | 10724 | 196 | 10688 | 154 |

Since, the determination of the locally optimal deployment solution and obtaining of the globally optimal deployment solution based on the locally optimal deployment solution is to meet the same plurality of objectives, the number of iterations requisite for convergence to obtain the globally optimal deployment solution is reduced. Also, the computation time requisite to obtain the globally optimal deployment solution meeting the plurality of objectives is, substantially reduced. Further, the fourth solution is observed to provide better optimality in lesser computation time. This may primarily, be due to the designed nature of CGTA, which uses the locally optimal deployment solution obtained from the local optimization module 114 as a knowledge set and attempts to improve it over time. This improvement is not discernible between the third solution due to the designed nature of GPA, which re-seeds and randomizes the locally optimal deployment solution obtained from the local optimization module 114 and does not effectively, learn from the knowledge set, resulting in increased delay and complexity.

From the observations, it can be inferred that, in situations where there is correlation between the input parameters such as the population density, building types, road types, vegetation, elevated land/hillocks, and the like received by the initial network planning module 112, the combination of PBCA for determining locally optimal deployment solution and CGTA for obtaining globally optimal deployment solution may result in better optimality of the deployment solution, as well as, substantially reduced computation time. In situations, where there is no correlation between the parameters received by the initial network planning module 112, the combination of PBCA for determining locally optimal deployment solution and GPA for obtaining globally optimal deployment solution may be used.

The deployment solution may be verified by the field engineers through drive tests. Based on observations from the drive test for the deployment solution, the field engineers may make suggestions to re-plan the network resource allocation in the communication network.

FIG. 2 illustrates a method 200 for network resource optimization in a communication networks, by the network optimization system 100, according to an implementation of the present subject matter. The order in which the method 200 is described, is not intended to be construed as a limitation, and any number of the described method blocks, can be combined in any order to implement the method 200 or any alternative methods. Additionally, individual blocks may be deleted from the method 200, without departing from the spirit and scope of the subject matter described, herein. Furthermore, the method 200 can be implemented in any suitable hardware, software, firmware, or combination thereof.

The method 200 may be described in the general context of computer executable instructions. Generally, computer executable instructions can include routines, programs, objects, components, data structures, procedures, modules, functions, etc., that perform particular functions or implement particular abstract data types. The method 200 may also, be practiced in a distributed computing environment, where functions are performed by remote processing devices that are linked through a communications network. In a distributed computing environment, computer executable instructions may be located in both local and remote computer storage media, including memory storage devices. The method 200 may be implemented in computing devices, such as computers, servers, and the like.

Referring to FIG. 2, at block 202, a number of network resources requisite to service a service area (referred to herein after as the pre-determined number of network resources), is calculated. The pre-determined number of network resources may depend on existing/estimated traffic patterns, based on existing/estimated network conditions. The pre-determined number of network resources for the service area, may be calculated in a manner as described earlier in the description.

At block 204, the service area is divided in to a plurality of sub-areas, where each of the plurality of sub-areas can be serviced by one or more network resources from the pre-determined number of network resources. The dividing of the service area in to the plurality of sub-areas may be based on distribution of DNs within the service area, wherein each DN corresponds to a pre-determined number of users. The dividing of the service area in to the plurality of sub-areas may also, be such that, the distribution of a total estimated/existing traffic among each of the plurality of sub-areas is fairly uniform. The non-uniformity in distribution of DNs within the service area may be considered during the division of the service area.

At block 206, a locally optimal deployment solution may be determined, where the locally optimal deployment solution may include local allocation attributes, such as a position, a height, a transmission power, an electrical tilt, a mechanical tilt, a number of sectors, operating frequencies, and an azimuth of the signal transceivers in each of the sub-areas, where the signal transceivers form a part of the network resources. The determining of the locally optimal deployment solution is done to meet a plurality of objectives for the network resource optimization. The plurality of objectives may include, two or more of a pre-defined cost, a pre-defined minimum coverage area, and a pre-defined service-level agreement parameter, such as a pre-defined minimum QoS, pre-defined maximum propagation delays, pre-defined maximum transmission delays, pre-defined maximum queuing delays, pre-defined maximum processing delays, a pre-defined minimum service throughput, a pre-defined minimum service utilization, a pre-defined minimum service availability, a pre-defined minimum service capacity, pre-defined maximum call drops, pre-defined maximum data loss, pre-defined maximum jitters, and the like. The determining of the locally optimal deployment solution may further, be based on existing/estimated network conditions. As described earlier, in an implementation, the PBCA may be implemented, to divide the service area into the sub-areas, and to obtain the locally optimal deployment solution.

The determining of the locally optimal deployment solution may further, be based on existing/estimated traffic patterns within the sub-area. The locally optimal deployment solution may be determined based on one or more of a population density, a path loss model, a coverage area, a propagation path loss, a traffic requirement, possible network resource locations, a maximum transmission power, a minimum transmission power, a maximum building height in the service area, a maximum antenna height, an average path loss in the service area, a frequency re-use factor, a frequency of operation, a number of channels, a channel capacity, a maximum Erlang capacity, a maximum number of transceiver slots, a minimum receiving threshold power for a subscriber, a minimum receiving threshold power for the pre-determined number of network resources, a call blocking probability, a call drop probability, a minimum threshold to make successful calls, and a minimum desired coverage. In an implementation, the BS cell design may be pre-computed, wherein the BS cell design may include the coverage attributes of the BS, and the determining of the locally optimal deployment solution is based on the pre-computed BS cell design. The determining of the locally optimal deployment solution based on the pre-computed BS cell design may substantially, reduce the computation time. In an implementation, identifying whether the locally optimal deployment solution meets the plurality of objectives may be performed, to obtain the globally optimal deployment solution.

Further, at block 208, a globally optimal deployment solution for allocation of the pre-determined number of network resources in the service area is obtained. The globally optimal deployment solution may include global allocation attributes, such as a position, a height, a transmission power, an electrical tilt, a mechanical tilt, a number of sectors, operating frequencies, and an azimuth of the signal transceivers in the service area, where the signal transceivers form a part of the network resources. The globally optimal deployment solution is obtained by iterative processing of the locally optimal deployment solution from the block 206 such that, the objectives, same as those considered to obtain the locally optimal deployment solution, are met. The determining of the globally optimal deployment solution may further, be based on existing/estimated network conditions in the service area. As described earlier, in an implementation, the GPA may be implemented, to obtain the globally optimal deployment solution. In another implementation, the CGTA may be implemented, to obtain the globally optimal deployment solution. In an implementation, the BS cell design may be pre-computed, wherein the BS cell design comprises the coverage attributes of the BS, and the obtaining of the globally optimal deployment solution is based on the pre-computed BS cell design. The obtaining of the globally optimal deployment solution based on the pre-computed BS cell design may substantially reduce the computation time. In an implementation, the obtaining of the globally optimal deployment solution may be based on the identification, whether the locally optimal deployment solution meets the plurality of objectives.

At block 210, it is determined whether the plurality of objectives is met by the globally optimal deployment solution or not. In case, when the globally optimal deployment solution does not meet the plurality of objectives ('NO' branch from block 210), the number of network resources requisite for servicing the service area is modified at block 212. As described earlier, the modification may either be increase or decrease of the pre-determined number of network resources requisite by a pre-defined value. Based on the changes in the pre-determined number of network resources, again the services area is divided into sub-areas, a locally optimal deployment solution is determined, and a globally optimal deployment solution is obtained.

As described, in an implementation, the joint optimization method may utilize the pre-computed BS cell design, to determine the locally optimal deployment solution and the globally optimal deployment solution. The utilizing of the pre-computed BS cell design in local optimization and the global optimization can reduce the computation time to obtain the globally optimal deployment solution.

In case, when the globally optimal deployment solution does meet the plurality of objectives ('YES' branch from block 210), the pre-determined plurality of the network resources are implemented in the service area of the communication network based on the globally optimal deployment solution at block 214. Here, implementing means either implementing the globally optimal deployment solution directly or providing the globally optimal deployment solution for subsequent implementation.

It would be appreciated that the described methods and systems for network resource optimization in communication networks can be, suitably, adapted to sensor deployment in buildings, stadiums, fields, etc., and may also, be used for optimal access point deployment in large buildings, housing societies, stadiums, etc.

Furthermore, the described methods and systems may also be used for cell selection based on QoS requisite/delivered, cost, etc. The joint optimization approach described can be used for optimal placement of border outposts, police outposts, security centers, etc. Further, the joint optimization approach may be used for optimal location determination and optimal number of such locations for public service centers, based on population density, topography, etc., where the public service centers may include Taluk offices, medical centers, Panchayat offices, Aadhar centers, etc. The described systems and methods can be suitably adapted for statistical analysis of data, two-stage routing and IC layout design, pattern recognition, etc.

Although the description, implementations and advantages of methods and systems for network resource optimization in communication networks have been described in a language specific to structural features and/or methods, it is to be understood that the present subject matter is not necessarily limited to the specific features or methods described. Rather, the specific features and methods are disclosed as implementations for network resource optimization in communication networks.

We claim:

1. A method for network resource optimization in a service area of a communication network, the method comprising:
    computing, by a processor, a pre-requisite number of network resources based on a plurality of parameters associated with a plurality of objectives for network resource optimization, one or more constraints associated with the network resources, and influences parameters associated with the service area to meet one or more objectives of the plurality of objectives, wherein the network resources comprises a plurality of base stations;
    determining, by the processor, initial deployment solution to obtain initial allocation attributes associated with the pre-requisite number of network resources comprising base stations, wherein determining the initial deployment solution comprises pre-computing a base station (BS) cell design for each feasible base station, wherein the BS cell design comprises at least one coverage attribute associated with the BS;
    dividing, by the processor, the service area into a plurality of sub-areas based on a Path loss Based Clustering Approach, wherein each of the plurality of sub-areas is serviced by at least one network resource from a pre-requisite number of network resources, wherein the division of the service area into the plurality of sub-areas is based on distribution of demand nodes within the service area, wherein each demand node corresponds to a pre-determined number of users on the communication network, wherein the number of network resources for servicing at least one sub-area is based on user preference or computation time requirement for network resource allocation;
    iteratively determining, by the processor, a locally optimal deployment solution, comprising at least one local allocation attribute for the at least one network resource in each of the plurality of sub-areas, by utilizing local threshold values corresponding to the one or more of the plurality of objectives to meet the one or more objectives for network resource optimization, wherein the locally optimal deployment solution is iteratively determined based on the local threshold values, wherein the local threshold values correspond to the initial local deployment solution and local deployment solutions obtained in each iteration, wherein the initial local deployment solution and each local deployment solution correspond to a base station (BS) deployment solution;
    obtaining, by applying a joint optimization technique, by the processor, a globally optimal deployment solution, comprising at least one global allocation attribute for allocation of the pre-requisite number of network resources in the service area, based on the iterative processing of the locally optimal deployment solution to meet the plurality of objectives, wherein the globally optimal deployment solution is obtained by iteratively processing the locally optimal deployment solution based on at least one of an existing traffic patterns, an estimated traffic patterns, and pragmatic network conditions in the service area in order to meet the one or more objectives.

2. The method as claimed in claim 1, comprising identifying whether the locally optimal deployment solution meets the plurality of objectives.

3. The method as claimed in claim 1 further comprising:
    determining whether the globally optimal deployment solution meets the plurality of objectives; and
    implementing the globally optimal deployment solution in the service area based on the determining.

4. The method as claimed in claim 3 further comprising modifying the pre-determined number of network resources for allocation in the service area based on the determining.

5. The method as claimed in claim 1, wherein the plurality of objectives comprises at least two of a pre-defined deployment cost, a pre-defined coverage area, and a pre-defined service-level agreement parameter.

6. The method as claimed in claim 1, wherein the local allocation attribute comprises at least one of a position, a height, a transmission power, an electrical tilt, a mechanical tilt, number of sectors, operating frequencies, and an azimuth, of signal transceivers associated with each of the pre-determined number of network resources.

7. The method as claimed in claim 1, wherein the global allocation attribute comprises at least one of a position, a height, a transmission power, an electrical tilt, a mechanical tilt, number of sectors, operating frequencies, and an azimuth, of signal transceivers associated with each of the pre-determined number of network resources.

8. The method as claimed in claim 1, wherein the plurality of parameters comprises a population density, a path loss model, a propagation path loss, a coverage area, a traffic requirement, network resource locations, a maximum transmission power, a minimum transmission power, a maximum building height in the service area, a maximum antenna height, an average path loss in the service area, a frequency re-use factor, a frequency of operation, a number of channels, a channel capacity, a maximum Erlang capacity, a maximum number of transceiver slots, a minimum receiving threshold power for a subscriber, a minimum receiving threshold power for the pre-determined number of network resources, a call blocking probability, a call drop probability, and a minimum threshold to make successful calls.

9. The method as claimed in claim 1, wherein the obtaining of the globally optimal deployment solution is based on a coverage area and a Cooperative Game Theoretic Approach.

10. The method as claimed in claim 1, wherein the local threshold values includes one of a minimum value, a maximum value and a range of values corresponding to each of the plurality of objectives.

11. The method as claimed in claim 1, wherein the pre-determined number of network resource is calculated based on a total estimated traffic in the service area.

12. The system as claimed in claim 1, wherein the plurality of parameters comprises a population density, a path loss model, a propagation path loss, a coverage area, a traffic requirement, network resource locations, a maximum transmission power, a minimum transmission power, a maximum building height in the service area, a maximum antenna height, an average path loss in the service area, a frequency re-use factor, a frequency of operation, a number of channels, a channel capacity, a maximum Erlang capacity, a maximum number of transceiver slots, a minimum receiving threshold power for a subscriber, a minimum receiving threshold power for the pre-determined number of network resources, a call blocking probability, a call drop probability, and a minimum threshold to make successful calls.

13. A network optimization system for network resource optimization in a service area of a communication network, the network optimization system comprising:
 a processor;
 initial network planning module coupled to the processor to
  compute a pre-requisite number of network resources based on a plurality of parameters associated with a plurality of objectives, one or more constraints associated with the network resources, wherein the network resources comprises a plurality of base stations, and influences parameters associated with the service area to meet the one or more objectives from the plurality objectives; and
  determine initial local deployment solution to obtain initial allocation attributes associated with the pre-requisite number of network resources comprising the base stations, wherein determining the initial local deployment solution comprises pre-computing a base station (BS) cell design for each feasible base station, wherein the BS cell design comprises at least one coverage attribute associated with the BS;
 a local optimization module coupled to the processor, to
  divide a service area into a plurality of sub-areas based on a Path loss Based Clustering Approach, wherein each of the plurality of sub-areas is serviced by at least one network resource from a pre-requisite number of network resources, wherein the division of the service area into the plurality of sub-areas is based on distribution of demand nodes within the service area, wherein each demand node corresponds to a pre-determined number of users on the communication network, wherein the number of network resources, for servicing at least one sub-area, is based on user preference or computation time requirement for network resource allocation; and
  iteratively determine a locally optimal deployment solution comprising at least one local allocation attribute for the at least one network resource in each of the plurality of sub-areas, by utilizing local threshold values corresponding to one or more of a plurality of objectives to meet the plurality of objectives for network resource optimization, wherein the locally optimal deployment solution is iteratively determining based on the local threshold values, wherein the local threshold values correspond to the initial local deployment solution and local deployment solutions obtained in each iteration, and wherein the initial local deployment solution and each local deployment solution corresponds to a base station deployment solution; and
 a global optimization module coupled to the processor, to obtain a globally optimal deployment solution by applying a joint optimization technique comprising at least one global allocation attribute for allocation of the pre-requisite number of network resources in the service area, based on the iterative processing of the locally optimal deployment solution to meet the plurality of objectives, wherein the globally optimal deployment solution is obtained by iteratively processing of the locally optimal deployment solution based on at least one of an existing traffic patterns, an estimated traffic patterns, and pragmatic network conditions in the service area in order to meet the plurality of objectives.

14. The network optimization system as claimed in claim 13 further comprising, a decision module coupled to the processor, to:
 determine whether the globally optimal deployment solution meets the plurality of objectives; and
 implement the globally optimal deployment solution based on the determining.

15. The network optimization system as claimed in claim 14 further comprising, a planning update module coupled to the processor, to modify the pre-determined number of network resources based on the determination, for allocation in the service area.

16. The network optimization system as claimed in claim 13, wherein the local optimization module determines the locally optimal deployment solution, based on a path loss based clustering approach, based at least on propagation path loss.

17. A non-transitory computer readable medium having a set of computer readable instructions that, when executed, cause a computing system to:
 compute a pre-requisite number of network resources based on a plurality of parameters associated with a plurality of objectives, one or more constraints associated with the network resources, wherein the network resources comprises a plurality of base stations, and influences parameters associated with the service area to meet the one or more objectives of the plurality of objectives;

determine initial deployment solution to obtain initial allocation attributes associated with the pre-requisite number of network resources comprising base stations, wherein determining the initial deployment solution comprises pre-computing a base station (BS) cell design for each feasible base station, wherein the BS cell design comprises at least one coverage attribute associated with the BS;

divide a service area into a plurality of sub-areas based on a Path loss Based Clustering Approach, wherein each of the plurality of sub-areas is serviced by at least one network resource from a pre-requisite number of network resources, wherein the division of the service area into the plurality of sub-areas is based on distribution of demand nodes within the service area, wherein each demand node corresponds to a pre-determined number of users on the communication network, wherein the number of network resources, for servicing at least one sub-area, is based on user preference or computation time requirement for network resource allocation;

iteratively determine a locally optimal deployment solution comprising at least one local allocation attribute for the at least one network resource in each of the plurality of sub-areas, by utilizing local threshold values corresponding to one or more of a plurality of objectives to meet the plurality of objectives for network resource optimization, wherein the iteratively determining the locally optimal deployment solution comprises iteratively determining the locally optimal deployment solution based on the local threshold values, wherein the local threshold values correspond to the initial deployment solution and deployment solutions obtained in each previous iteration;

obtain a globally optimal deployment solution by applying a joint optimization technique comprising at least one global allocation attribute for allocation of the pre-requisite number of network resources in the service area, based on iterative processing of the locally optimal deployment solution to meet the plurality of objectives, wherein the globally optimal deployment solution is obtained by iteratively processing of the locally optimal deployment solution based on at least one of an existing traffic patterns, an estimated traffic patterns, and pragmatic network conditions in the service area in order to meet the plurality of objectives.

* * * * *